(12) United States Patent
Hsu et al.

(10) Patent No.: US 7,555,817 B2
(45) Date of Patent: Jul. 7, 2009

(54) HINGE WITH LESS ABRASION

(75) Inventors: Jia-Hao Hsu, Shulin (TW); An-Di Lu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 267 days.

(21) Appl. No.: 11/598,300

(22) Filed: Nov. 13, 2006

(65) Prior Publication Data

US 2008/0109992 A1 May 15, 2008

(51) Int. Cl.
*E05D 3/10* (2006.01)
(52) U.S. Cl. ........................................................ 16/367
(58) Field of Classification Search .................. 16/273, 16/337–340, 365–367, 374
See application file for complete search history.

(56) References Cited

U.S. PATENT DOCUMENTS

| | | | | |
|---|---|---|---|---|
| 5,666,694 A * | 9/1997 | Slow et al. | ...................... | 16/368 |
| 6,018,847 A * | 2/2000 | Lu | ............................... | 16/337 |
| 6,108,868 A * | 8/2000 | Lin | ............................. | 16/340 |
| 6,347,433 B1 * | 2/2002 | Novin et al. | ................... | 16/367 |
| 6,378,830 B1 * | 4/2002 | Lu | .......................... | 248/278.1 |
| 6,427,288 B1 * | 8/2002 | Saito | ........................... | 16/361 |
| 6,532,628 B2 * | 3/2003 | Kim | ........................... | 16/342 |
| 6,698,063 B2 * | 3/2004 | Kim et al. | ....................... | 16/337 |
| 6,742,221 B2 * | 6/2004 | Lu et al. | ........................ | 16/367 |
| 6,772,983 B1 * | 8/2004 | Liao et al. | ................ | 248/291.1 |
| 6,804,861 B2 * | 10/2004 | Hsu | .............................. | 16/366 |
| 6,813,813 B2 * | 11/2004 | Lu et al. | ........................ | 16/342 |
| 6,845,546 B1 * | 1/2005 | Lu et al. | ........................ | 16/367 |
| 6,883,206 B2 * | 4/2005 | Yang et al. | ..................... | 16/337 |
| 6,941,618 B2 * | 9/2005 | Kim | ............................. | 16/337 |
| 6,954,221 B2 * | 10/2005 | Wu | .............................. | 361/681 |
| 2001/0052167 A1 * | 12/2001 | Cho | ............................. | 16/337 |
| 2003/0097732 A1 * | 5/2003 | Kim | ............................. | 16/337 |
| 2003/0221289 A1 * | 12/2003 | Lu | ................................ | 16/340 |
| 2004/0083577 A1 * | 5/2004 | Lu et al. | ........................ | 16/367 |
| 2004/0107540 A1 * | 6/2004 | Hsu | ........................... | 16/366 |
| 2004/0200038 A1 * | 10/2004 | Kim | ............................. | 16/367 |
| 2005/0060843 A1 * | 3/2005 | Hung | ........................... | 16/367 |
| 2005/0091796 A1 * | 5/2005 | Lu et al. | ........................ | 16/337 |
| 2005/0108854 A1 * | 5/2005 | Lee et al. | ....................... | 16/340 |

FOREIGN PATENT DOCUMENTS

| | | | |
|---|---|---|---|
| JP | 11257342 A | 9/1999 |
| JP | 2000054715 A | 2/2000 |
| JP | 2000064701 A | 2/2000 |
| JP | 2001207229 A | 7/2001 |

* cited by examiner

*Primary Examiner*—Victor Batson
*Assistant Examiner*—Roberta Delisle
(74) *Attorney, Agent, or Firm*—William E. Pelton, Esq.; Cooper & Dunham LLP

(57) ABSTRACT

A hinge with less abrasion has a central bracket, a first tilt hinge assembly, a second tilt hinge assembly and a rotating hinge assembly. The central bracket has a main arm, a first arm and a second arm. The main arm has annular recess formed on an inner surface of the main arm. The first arm has annular recess respectively formed on an inner surface and an outer surface of the first arm. The first and second tilt hinge assemblies connect respectively to the first and second arms. The rotating hinge assembly connects to the main arm. Because strength of a material is enhanced when the material is pressed, the annular recesses of the main and first arms enhance the strength of the main and first arms to reduce the abrasion between the central bracket and the hinge assemblies.

7 Claims, 14 Drawing Sheets

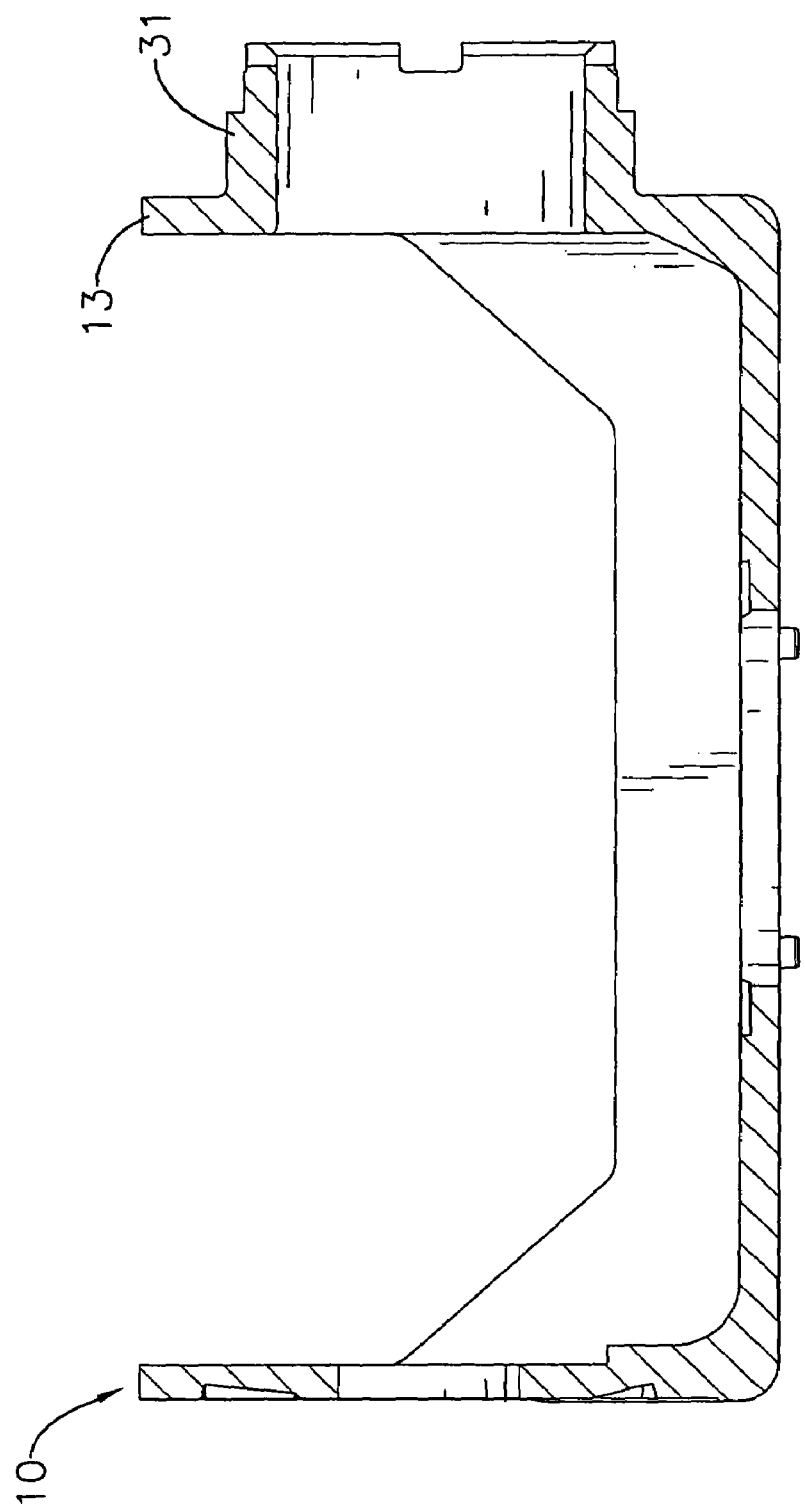

HINGE WITH LESS ABRASION

BACKGROUND OF THE INVENTION

1. Field of the Invention

The present invention relates to a hinge, especially to a hinge with less abrasion and mounted between a cover and a base of an electronic appliance.

2. Description of the Prior Arts

Electrical appliances such as notebook computers, cell phones, etc. have a cover, a base and a conventional hinge. The conventional hinge connects the cover to the base along a transverse axis and a longitudinal axis to allow the cover to pivot relative to the base. To keep the electronic appliance from being damaged when the cover is pivoted relative to the base, the conventional hinge comprises many spacers having corresponding structures to provide positioning and limiting functions. However, the corresponding spacers have to rotate relative each other to provide positioning and limiting functions. When the corresponding spacers rotate relative each other, the corresponding spacers rub against and wear each other. Therefore, the corresponding spacers are damaged easily.

To overcome the shortcomings, the present invention provides a hinge with less abrasion to mitigate or obviate the aforementioned problems.

SUMMARY OF THE INVENTION

The main objective of the present invention is to provide a hinge with less abrasion. The hinge with less abrasion has a central bracket, a first tilt hinge assembly, a second tilt hinge assembly and a rotating hinge assembly. The central bracket has a main arm, a first arm and a second arm. The main arm has annular recess formed on an inner surface of the main arm. The first arm has annular recess respectively formed on an inner surface and an outer surface of the first arm. The first and second tilt hinge assemblies connect respectively to the first and second arms. The rotating hinge assembly connects to the main arm. Because strength of a material is enhanced when the material is pressed, the annular recesses of the main and first arms enhance the strength of the main and first arms to reduce the abrasion between the central bracket and the hinge assemblies.

Other objectives, advantages and novel features of the invention will become more apparent from the following detailed description when taken in conjunction with the accompanying drawings.

BRIEF DESCRIPTION OF THE DRAWINGS

FIG. 16 is a side view in partial section of the barrel and a central bracket of the hinge in FIG. 13.

DETAILED DESCRIPTION OF THE PREFERRED EMBODIMENTS

Figure 1:
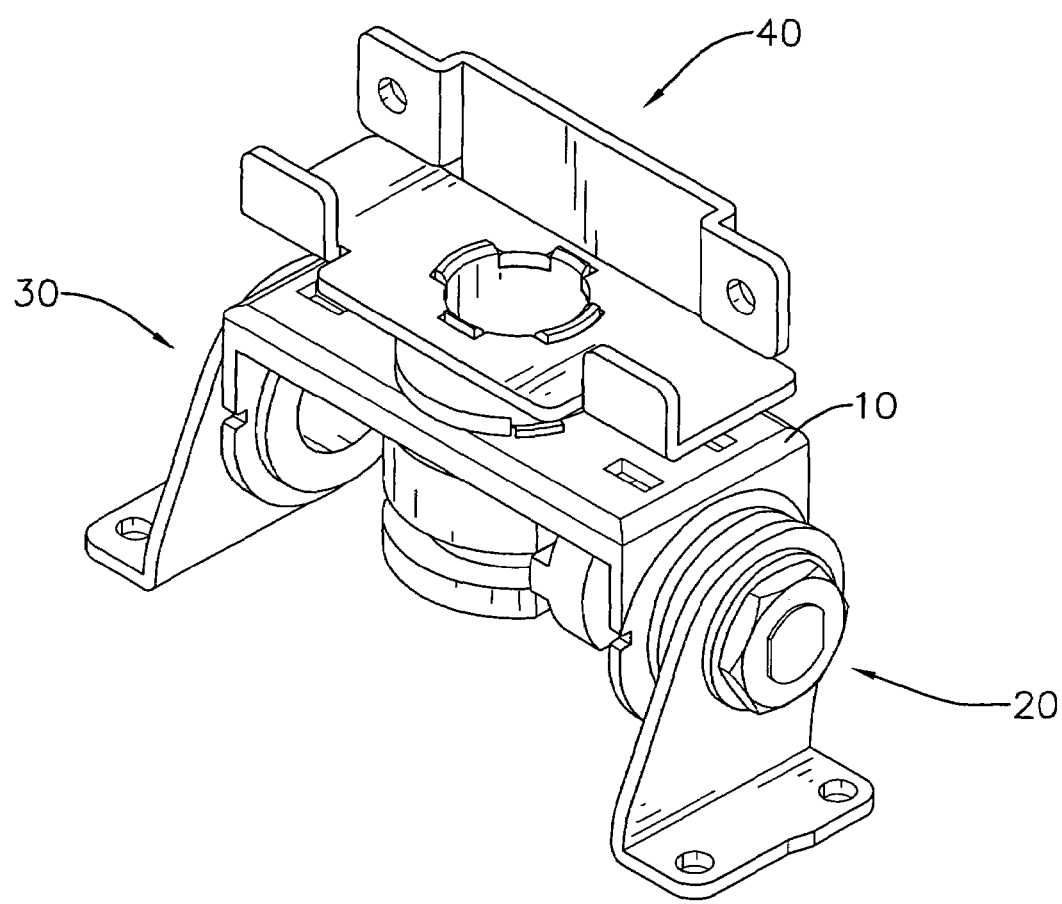
FIG. 1 is a perspective view of a first embodiment of a hinge in accordance with the present invention.
Figure 2:
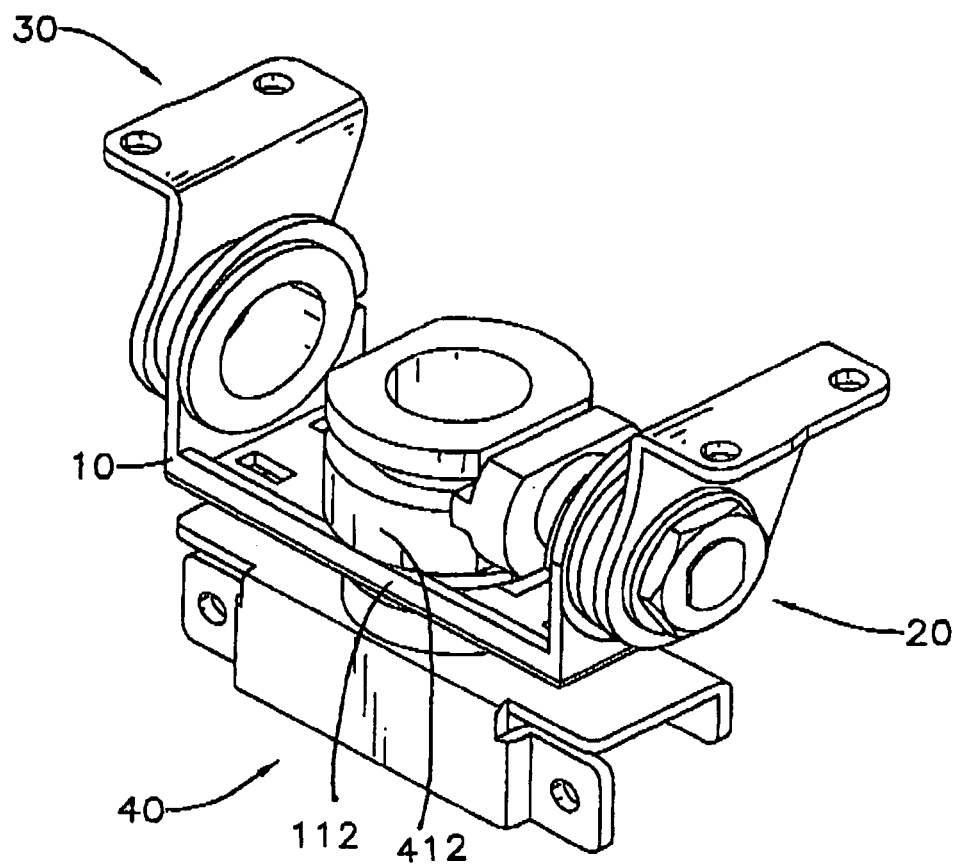
FIG. 2 is another perspective view of the hinge in FIG. 1.

With reference to FIGS. 1 and 2, a hinge in accordance with the present invention comprises a central bracket (10), a first tilt hinge assembly (20), a second tilt hinge assembly (30) and a rotating hinge assembly (40).

Figure 3:
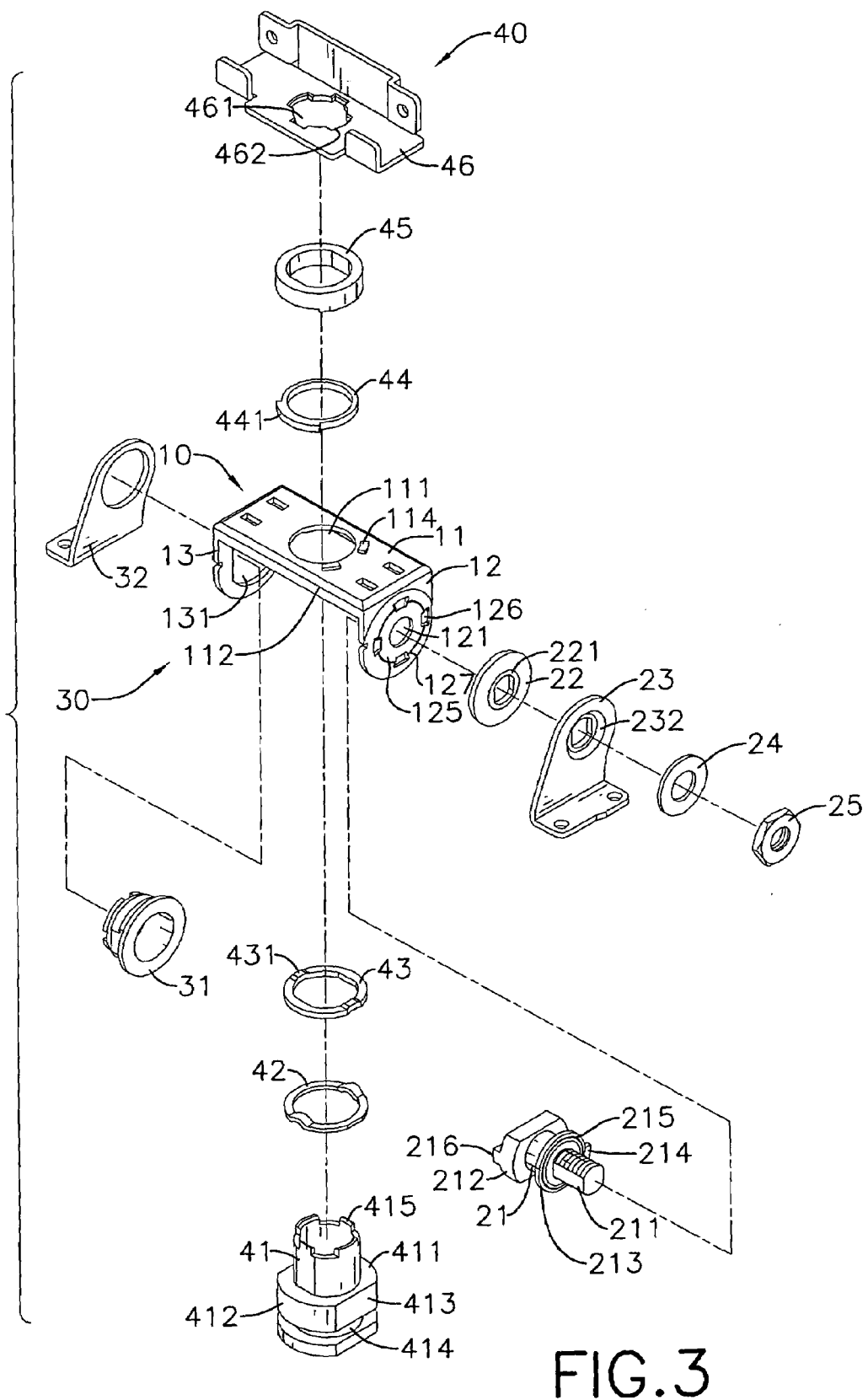
FIG. 3 is an exploded perspective view of the hinge in FIG. 1.
Figure 4:
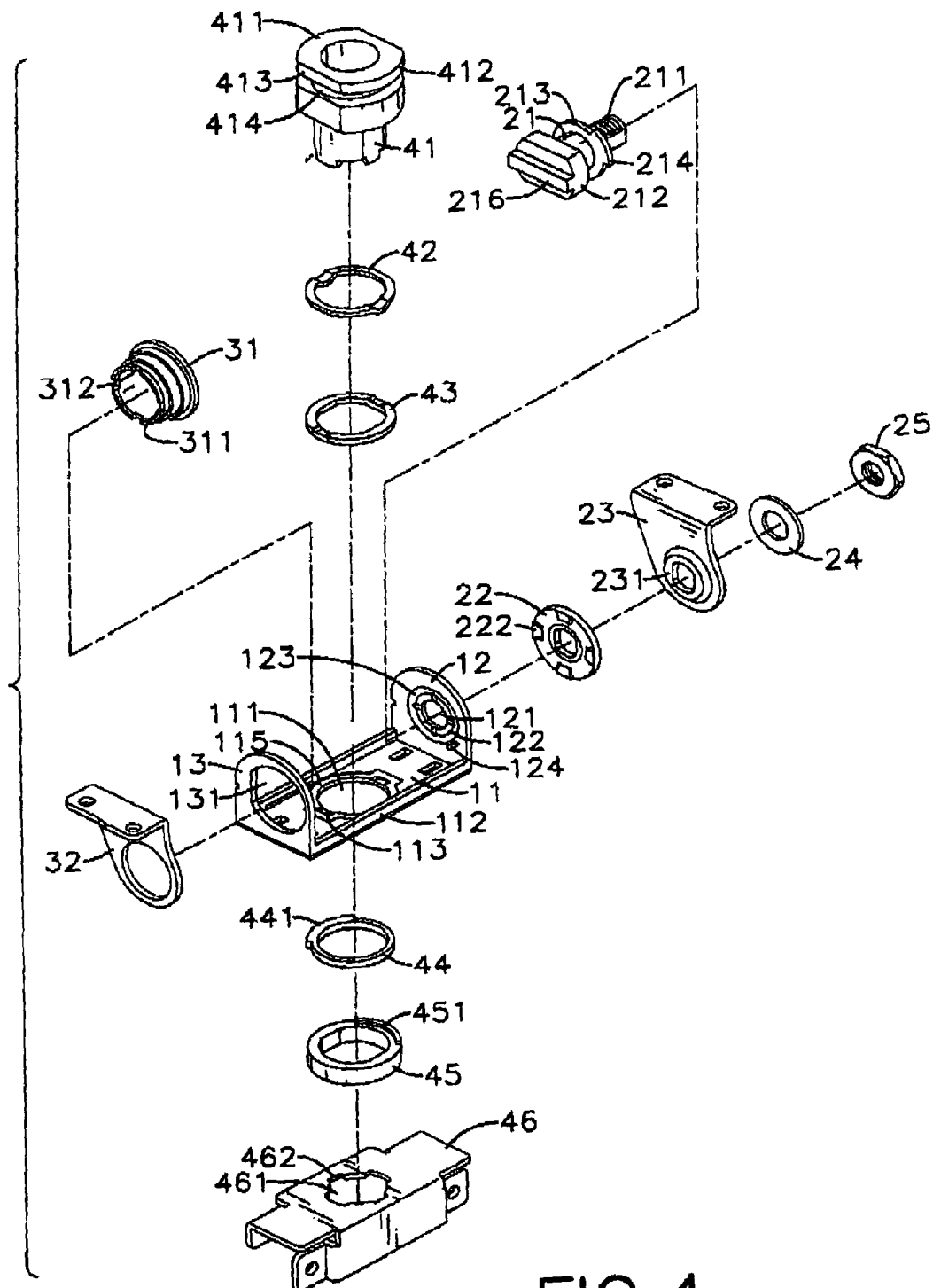
FIG. 4 is another exploded perspective view of the hinge in FIG. 1.
Figure 5:
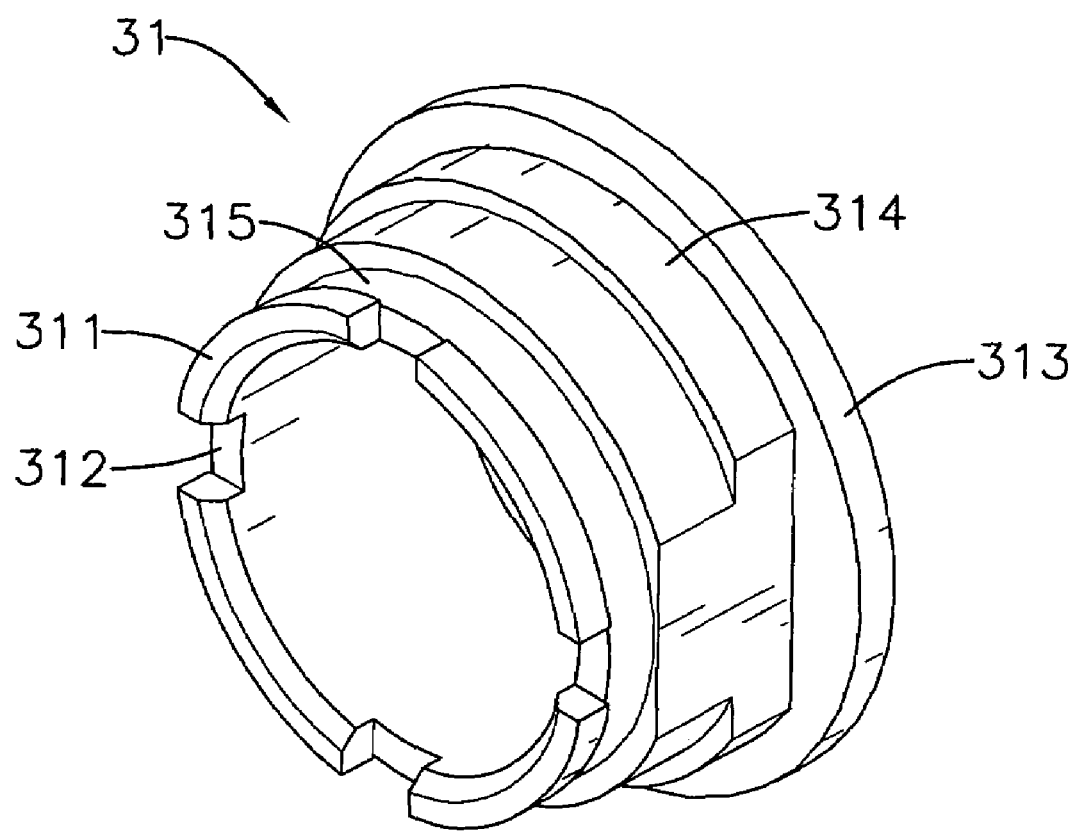
FIG. 5 is perspective view of a barrel of the hinge in FIG. 1.

With reference to FIGS. 3 and 4, the central bracket (10) is U-shaped and comprises a main arm (11), a first arm (12) and a second arm (13).

The main arm (11) has a first end, a second end, an inner surface, an outer surface, two sides, a circular central hole (111), two ribs (112), an annular recess (115), at least one positioning detent (113), at least one limiting protrusion (114). The ribs (112) are respectively and perpendicularly formed on the two sides of the main arm (11) and extend from the inner surface. The annular recess (115) is formed in the inner surface of the main arm (11) around the central hole (111). The at least one positioning detent (113) is formed in the annular recess (115). The at least one limiting protrusion (114) is formed on and extends from the outer surface of the main arm (11).

The first arm (12) is formed perpendicularly on the first end of the main arm (11). The first arm (12) has an inner surface, an outer surface, a circular central hole (121), an inner annular recess (122), an inclined surface (123), at least one limiting protrusion (124), an outer annular recess (125), at least one positioning detent (126) and an oil channel (127). The inner annular recess (122) is formed in the inner surface of the first arm (12) around the central hole (121). The inclined surface (123) is formed around the inner annular recess (122). The at least one limiting protrusion (124) is formed on and extends from the inner surface of the first arm (12). The outer annular recess (125) is formed in the outer surface of the first arm (12) around the central hole (121). The at least one positioning detent (126) is formed in the outer annular recess (125). The oil channel (127) is formed in the outer annular recess (125).

The second arm (13) is formed perpendicularly on the second end of the main arm (11) and has a non-circular central hole (131).

The first tilt hinge assembly (20) connects to the first arm (12) of the central bracket (10) and comprises a tilt shaft (21), a stationary positioning spacer (22), a first rotating bracket (23), a washer (24) and a fastener (25).

The tilt shaft (21) connects rotatably to the first arm (12) of the central bracket (10) and has an inner end, an outer end, an extension rod (211), a positioning head (212), a limiting head (213), a limiting protrusion (214), an annular protrusion (215) and a positioning protrusion (216). The extension rod (211) is formed axially on the outer end of the tilt shaft (21) and extends through the central hole (121) of the first arm (12). The extension rod (211) may be a threaded rod. The positioning head (212) is formed radially on the inner end of the tilt shaft (21). The limiting head (213) is formed radially on the outer end of the tilt shaft (21). An outer surface of the limiting head (213) abuts the inner surface of the first arm (12). The limiting protrusion (214) is formed transversely on an edge of the limiting head (213) and selectively abuts the at least one limiting protrusion (124) of the first arm (12). The annular protrusion (215) is formed on the outer surface of the limiting head (213) around the extension rod (211) and corresponds to and engages the inner annular recess (122) of the first arm (12). The positioning protrusion (216) is formed on an inner surface of the positioning head (212).

Figure 6:
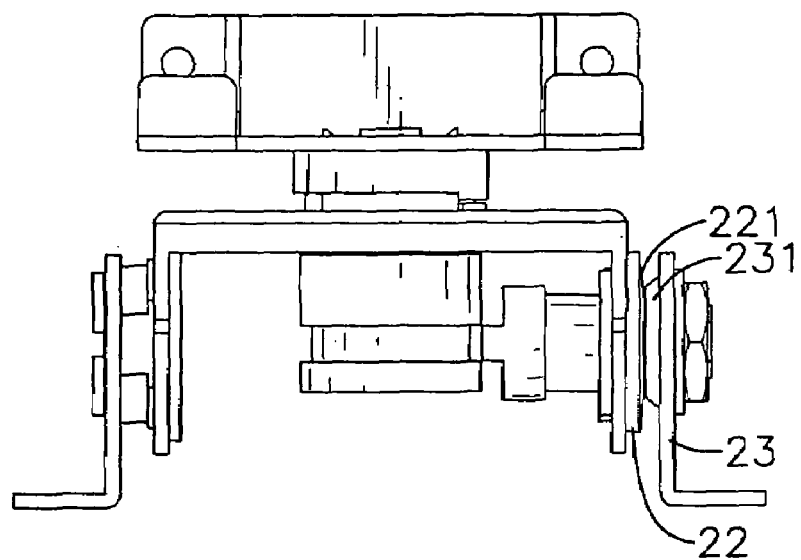
FIG. 6 is a side view of the hinge in FIG. 1.
Figure 7:
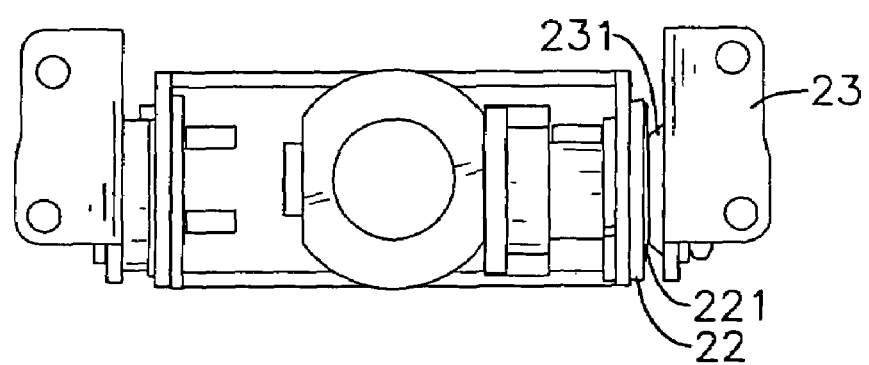
FIG. 7 is a bottom view of the hinge in FIG. 1.

With further reference to FIGS. 6 and 7, the stationary positioning spacer (22) is mounted securely on the extension rod (211) of the tilt shaft (21) and is adjacent to the outer surface of the first arm (12). The stationary positioning spacer (22) is resilient, is ">-shaped" in side view and has an inner surface, an outer surface, a central protrusion (221) and at least one positioning protrusion (222). An annular edge of the inner surface of the stationary positioning spacer (22) abuts the outer surface of the first arm (12). The central protrusion (221) is formed axially around a central of the outer surface of the stationary positioning spacer (22). The at least one positioning protrusion (222) is formed on the inner surface of the stationary positioning spacer (22) and corresponds to and selectively engages the at least one positioning detent (126) of the first arm (12).

The first rotating bracket (23) is mounted securely on the extension rod (211) of the tilt shaft (21), is L-shaped and has a main leaf. The main leaf of the first rotating bracket (23) is mounted securely on the extension rod (211) of the tilt shaft (21) and has an inner surface, an outer surface, a central protrusion (231) and a central recess (232). The central protrusion (231) is formed axially around a central of the inner surface of the main leaf of the first rotating bracket (23) and abuts the central protrusion (221) of the stationary positioning spacer (22). The central recess (232) is formed in the outer surface of the main leaf of the first rotating bracket (23).

The washer (24) is mounted around the extension rod (211) of the tilt shaft (21). The fastener (25) is mounted securely on a tip of the extension rod (211) of the tilt shaft (21). The fastener (25) may be a nut screwed onto the extension rod (211).

With reference to FIGS. 3, 4, 5, 14, 15 and 16, the second tilt hinge assembly (30) connects to the second arm (13) of the central bracket (10) and comprises a barrel (31) and a second rotating bracket (32).

The barrel (31) connects securely to the second arm (13) of the central bracket (10), is non-circular in cross section and has an inner end, an outer end, an outer wall, multiple steps and an annular protrusion (311). The steps are formed along the outer wall of the barrel (31) and the diameters of the steps are reduced from the inner end to the outer end. The steps comprise a head (313) formed on the inner end of the barrel (31), an initial step (314) formed adjacent to the head (313), and a last step (315) formed on the outer end of the barrel (31). The head (313) of the barrel (31) has the largest diameter of the steps, the initial step (314) has the second largest diameter of the steps, and the last step (315) has the smallest diameter of the steps. The annular protrusion (311) extends axially out of the outer end of the barrel (31). Multiple gaps (312) are formed in the annular protrusion (311).

An extension wing (317) extends radially out of the inner end of the barrel (31) and abuts the main arm (11) of the central bracket (10) to increase stability.

The barrel (31) is mounted securely in the central hole (131) of the second arm (13) of the central bracket (10). The initial step (314) may be mounted tightly in the central hole (131) of the second arm (13) of the central bracket (10) to mount the barrel (31) securely in the central hole (131) of the second arm (13). The barrel (31) may have a fastening protrusion (316) extending radially out of the outer wall of the barrel (31) and abutting the outer surface of the second arm (13) to mount the barrel (31) securely in the central hole (131) of the second arm (13). The barrel (31) may be formed on the second arm (13).

The second rotating bracket (32) is mounted rotatably on the last step (315) of the barrel (31) and abuts the annular protrusion (311) of the barrel (31).

With reference to FIGS. 3 and 4, the rotating hinge assembly (40) connects to the main arm (11) of the central bracket (10). The rotating hinge assembly (40) comprises a central shaft (41), a resilient spacer (42), a rotating positioning spacer (43), a stationary limiting spacer (44), a rotating limiting spacer (45) and a fastening bracket (46).

The central shaft (41) connects rotatably to the main arm (11), extends through the central hole (111) of the main arm (11) and has an inner end, an outer end, a limiting head (411) and multiple fastening protrusions (415). The limiting head (411) is formed radially on the inner end of the central shaft (41), corresponds to the positioning head (212) of the tilt shaft (21) and has two limiting sides (412), two flat sides (413) and an annular slot (414). The limiting sides (412) are opposite to each other. The flat sides (413) are opposite to each other. Each limiting side (412) are formed between two flat sides (413). The limiting sides (412) and the flat sides (413) alternatively align with the positioning head (212) of the tilt shaft (21). The annular slot (414) is formed radially in the limiting head (411) of the central shaft (41) and corresponds to and selectively engages the positioning protrusion (216) of the positioning head (212) of the tilt shaft (21). The fastening protrusions (415) extend axially from the outer end of the central shaft (41).

The resilient spacer (42) is mounted around the central shaft (41).

The rotating positioning spacer (43) is mounted securely on the central shaft (41) and is adjacent to the inner surface of the main arm (11) and has at least one positioning protrusion (431). The at least one positioning protrusion (431) is formed on the rotating positioning spacer (43) and corresponds to and selectively engages the positioning detent (113) of the main arm (11).

Figure 13:
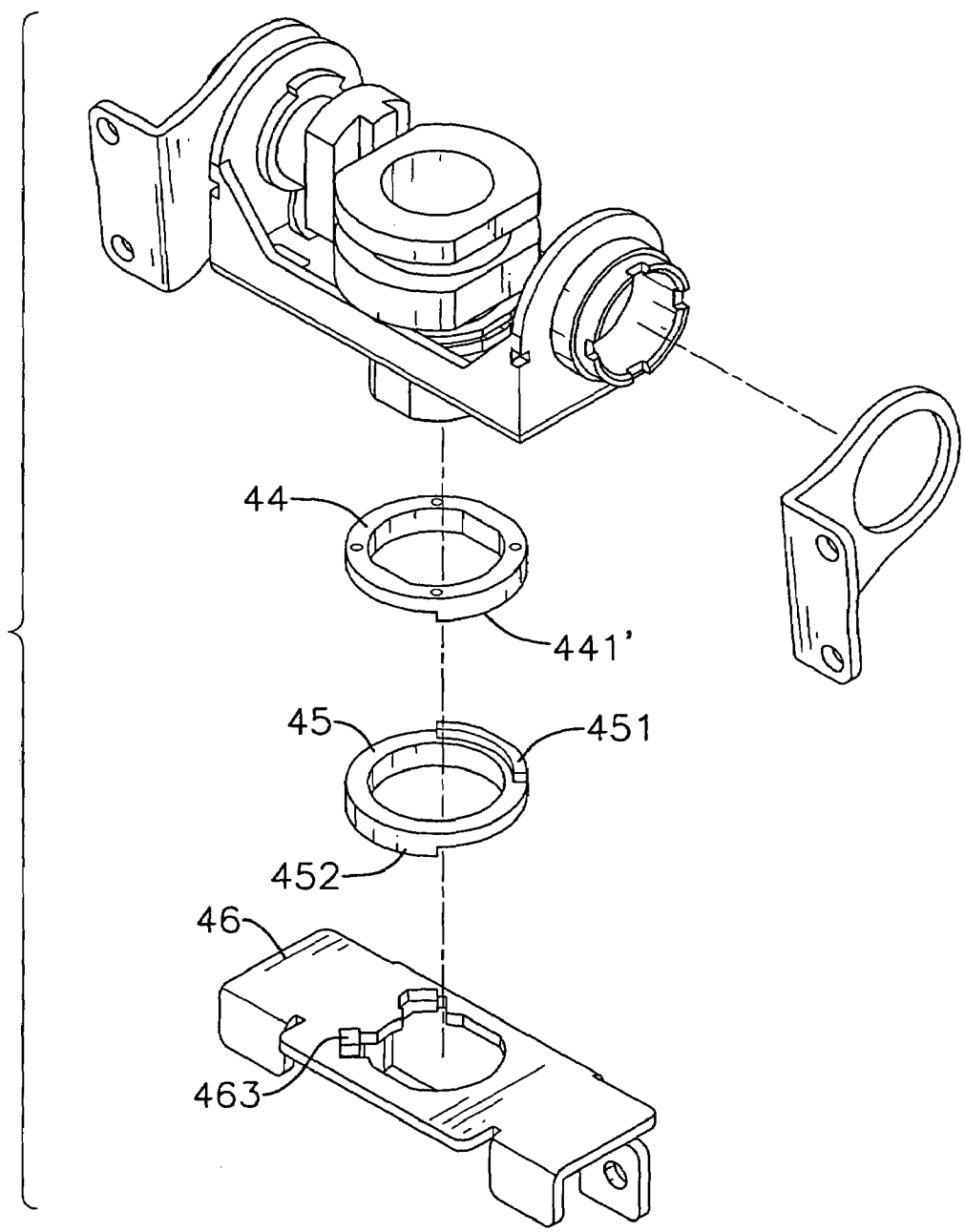
FIG. 13 is a partially exploded perspective view of a second embodiment of a hinge in accordance with the present invention.
Figure 14:
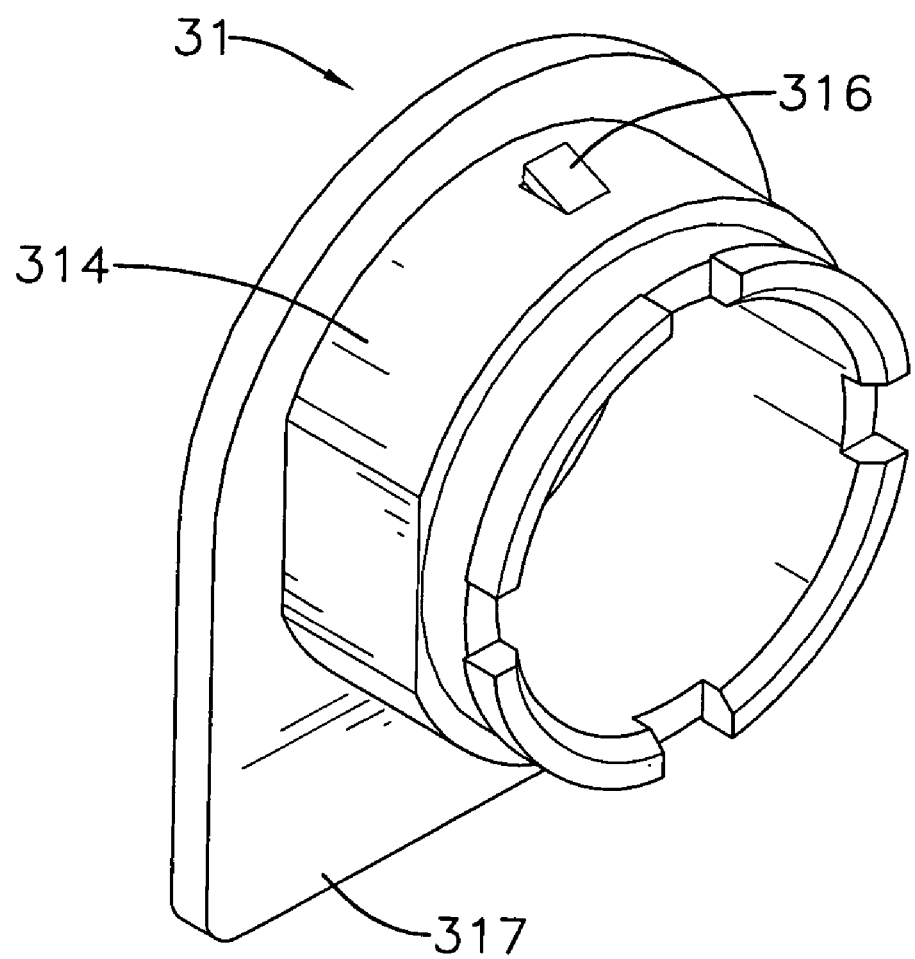
FIG. 14 is a perspective view of a barrel of a third embodiment of a hinge in accordance with the present invention.
Figure 15:
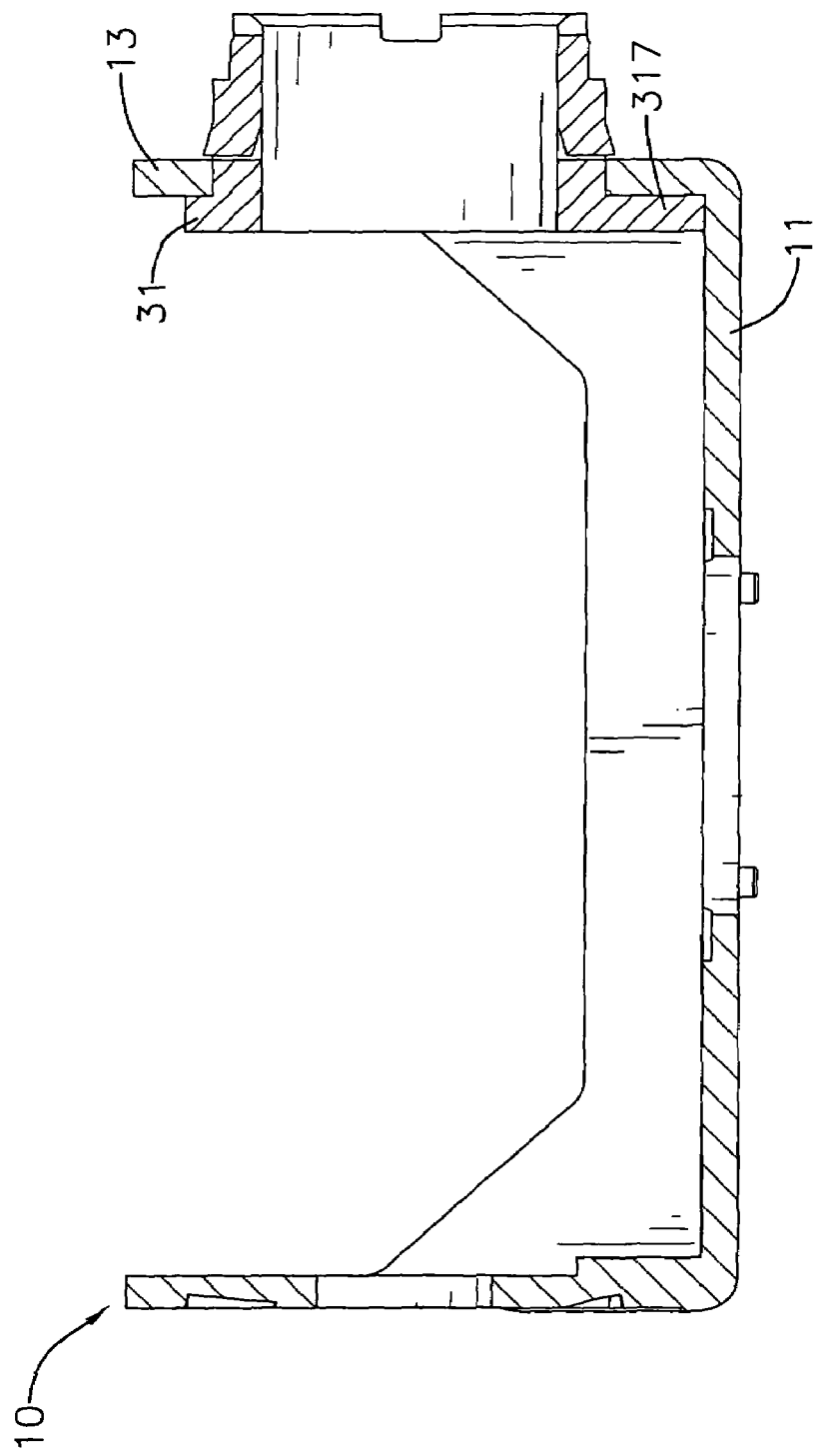
FIG. 15 is a side view in partial section of the barrel and a central bracket of the hinge in FIG. 14.

With further reference to FIG. 13, the stationary limiting spacer (44) is mounted around the central shaft (41) and has a thickness, a limiting protrusion (441) formed radially on an edge of the stationary limiting spacer (44) or a limit protrusion (441') formed axially on the stationary limiting spacer (44).

The rotating limiting spacer (45) is mounted securely on the central shaft (41) and has a thickness, a first limiting protrusion (451) and a second limiting protrusion (452). The thickness of the rotating limiting spacer (45) is thicker than the thickness of the stationary limiting spacer (44). The first and second limiting protrusions (451, 452) are formed axially on the rotating limiting spacer (45) and are opposite to each other. The first limiting protrusion (451) selectively abuts the limiting protrusions (114, 441, 441') of the main arm (11) and the stationary limiting spacer (44).

The fastening bracket (46) is mounted securely on the outer end of the central shaft (41) and has a fastening hole (461), multiple fastening detents (462) and at least one limiting protrusion (463). The fastening detents (462) are formed radially in the fastening hole (461) and engage the fastening protrusions (415) of the central shaft (41) to mount the fastening bracket (46) securely on the central shaft (41). The at least one limiting protrusion (463) is formed on the fastening bracket (46) and corresponds to and selectively abuts the second limiting protrusion (452) of the rotating limiting spacer (45).

Figure 8:
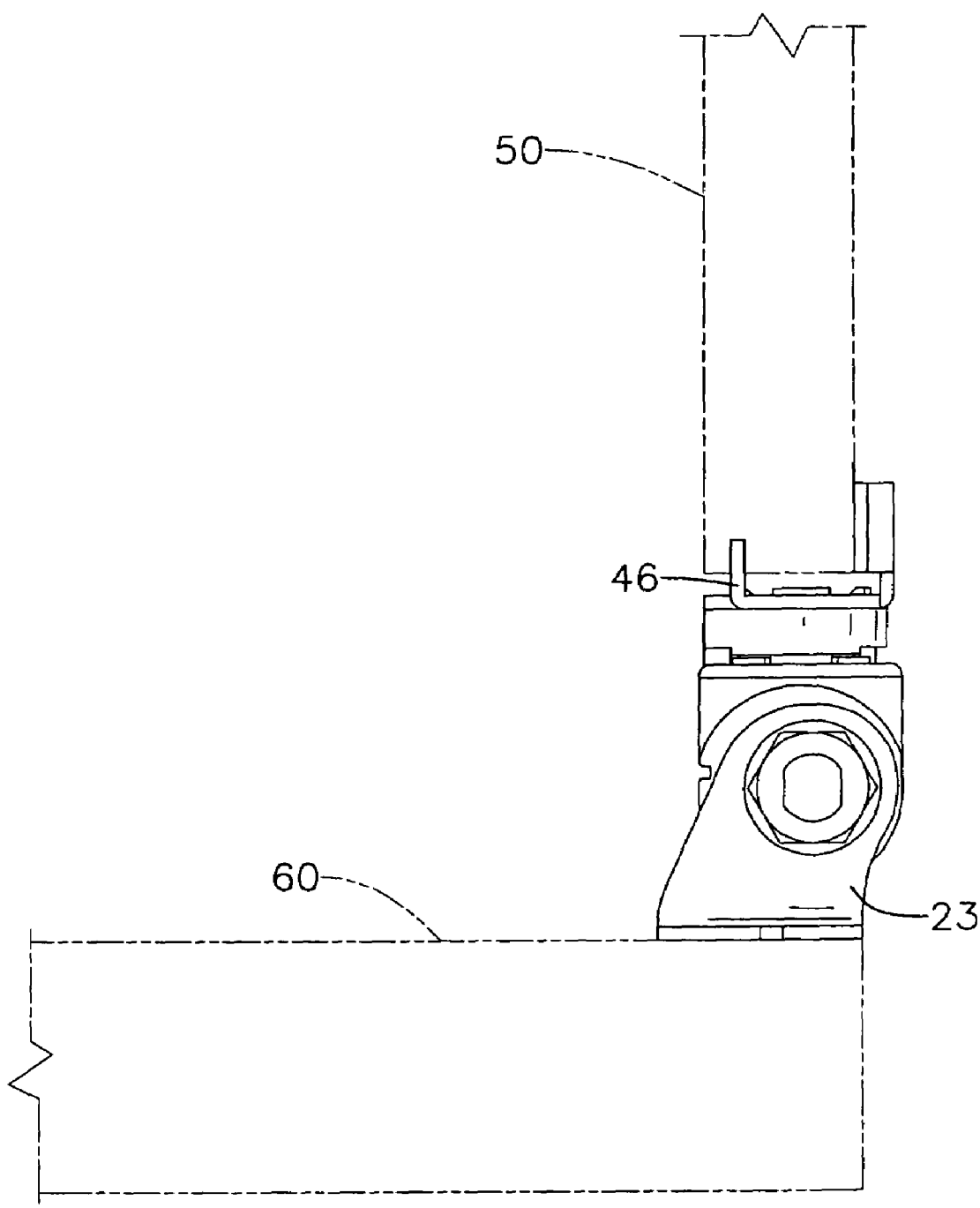
FIG. 8 is an end view of the hinge in FIG. 1 mounted in an electronic device.
Figure 9:
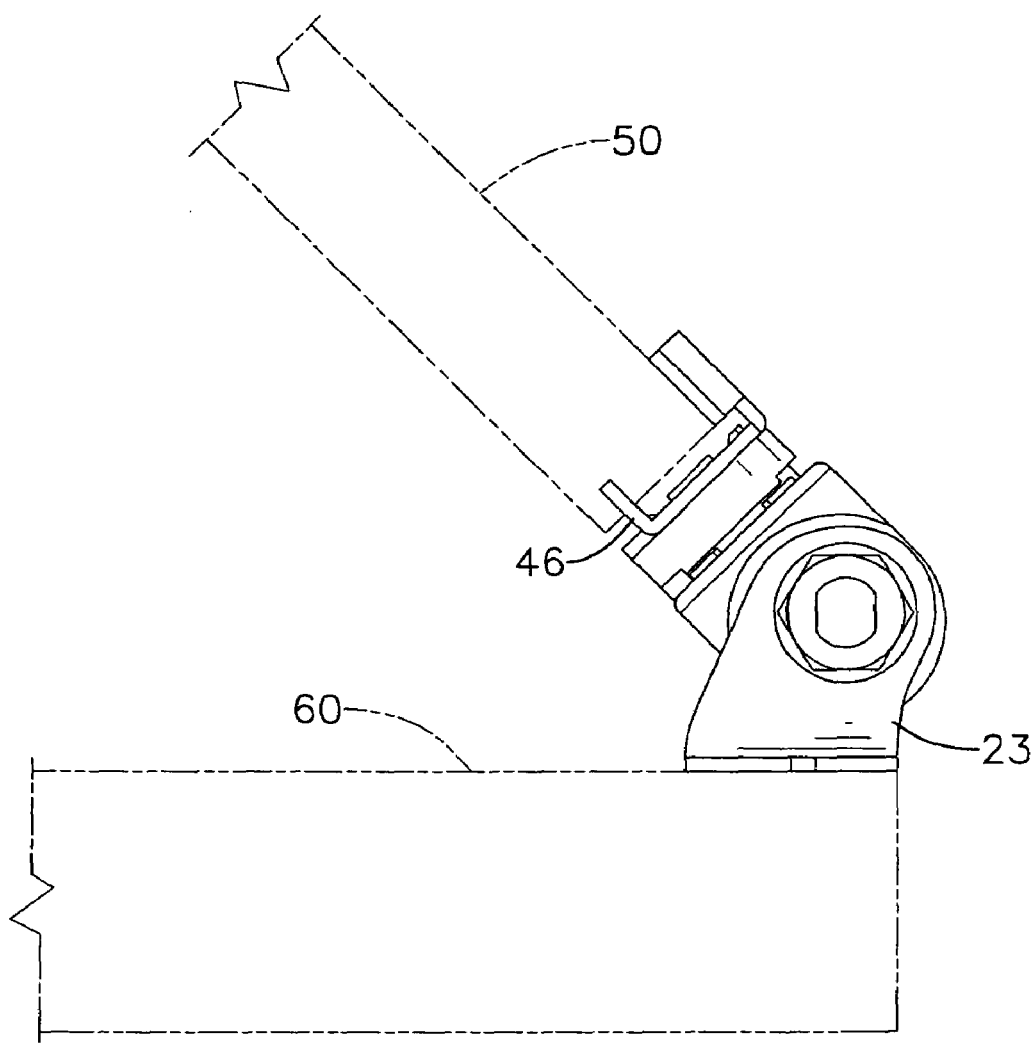
FIG. 9 is an operational end view of the hinge in FIG. 1 mounted in the electronic device when the electronic device is closed.
Figure 10:
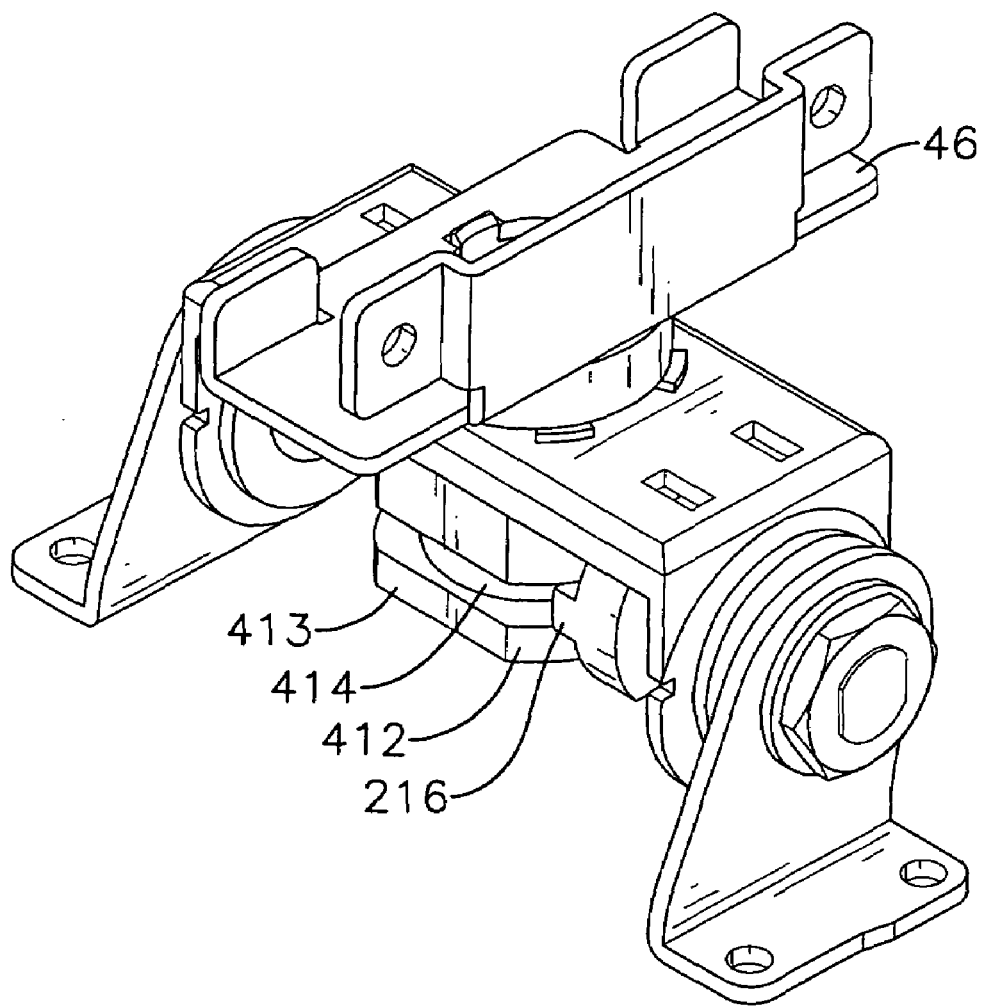
FIG. 10 is an operational perspective view of the hinge in FIG. 1.
Figure 11:
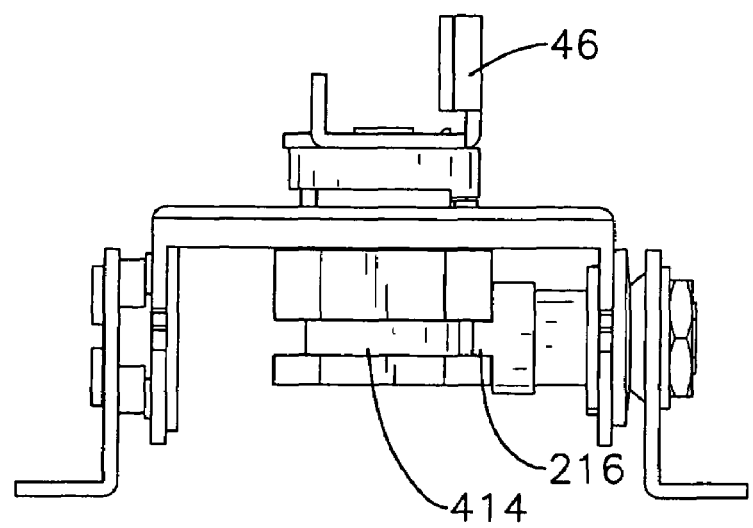
FIG. 11 is an operational side view of the hinge in FIG. 1.
Figure 12:
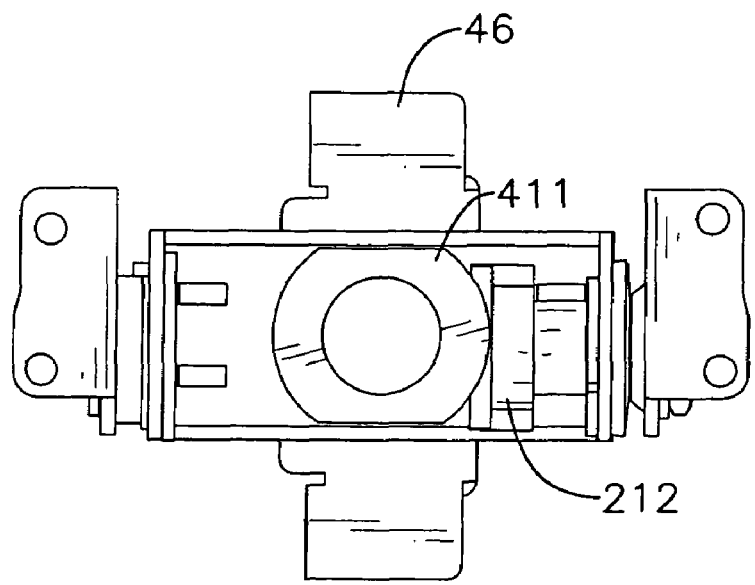
FIG. 12 is an operational bottom view of the hinge in FIG. 1.

With reference to FIGS. 3 and 8, the hinge as described is mounted between a cover (50) and a base (60). The fastening bracket (46) of the rotating hinge assembly (40) is attached to the cover (50). The first and second rotating brackets (23, 32) are attached to the base (60). With further reference to FIG. 9, when the cover (50) is opened or closed relative to the base (60), the cover (50) rotates the central bracket (10) and the rotating hinge assembly (40) relative to the first and second rotating brackets (23, 32). With further reference to FIG. 10, when the cover (50) is rotated relative to the base (60), the cover (50) rotates the fastening bracket (46) relative to the central bracket (10).

With reference to FIGS. 3, 4, 8 and 9, the cover (50) is opened or closed relative to the base (60). The first arm (12) is rotated relative to the tilt shaft (21).

Because the stationary positioning spacer (22) is mounted securely on the tilt shaft (21), the first arm (12) rotates relative to the stationary positioning spacer (22). When the at least one positioning detent (126) of the first arm (12) engages the at least one positioning protrusion (222), the cover (50) is positioned relative to the base (60).

The limiting protrusion (124) of the first arm (12) abuts the limiting protrusion (214) of the tilt shaft (21) to limit the rotating angle of the cover (50).

When the first arm (12) rotates relative to the tilt shaft (21), the limiting head (213) of the tilt shaft (21) rubs against the inner annular recess (122) and the inclined surface (123) of the first arm (12). Because a strength of a material is enhanced when the material is pressed, the inner annular recess (122) and the inclined surface (123) of the first arm (12) enhance the strength of the first arm (12) to reduce the abrasion between the limiting head (213) of the tilt shaft (21). In the same principle, the outer annular recess (125) reduces the abrasion on the outer surface of the first arm (12).

With reference to FIGS. 3, 4, 8 and 10 to 12, the cover (50) is rotated relative to the base (60). The fastening bracket (46) rotates the central shaft (41) relative to the central bracket (10).

Because the rotating positioning spacer (43) is mounted securely on the central shaft (41), the rotating positioning spacer (43) is rotated relative to the main arm (11) of the central bracket (10). When the at least one positioning protrusion (431) of the rotating positioning spacer (43) engages the at least one positioning detent (113) of the main arm (11), the cover (50) is positioned relative to the base (60).

Because the rotating limiting spacer (45) is mounted securely on the central shaft (41), the rotating limiting spacer (45) is rotated relative to the stationary limiting spacer (44) and the main arm (11). The limiting protrusions (451, 452) of the rotating limiting spacer (45) abut the limiting protrusions (114, 441, 441') of the main arm (11) and the stationary limiting spacer (44) to limit the rotating angle of the cover (50).

When the rotating positioning spacer (43) rotates relative the main arm (11), the rotating positioning spacer (43) rubs against the inner surface of the main arm (11). The annular recess (15) of the main arm (11) reduces the abrasion of the main arm (11).

When the flat sides (413) of the limiting head (411) of the central shaft (41) align with the positioning head (212) of the tilt shaft (21), the positioning protrusion (216) is engaged from the annular slot (414) in the limiting head (411) of the central shaft (41) and the limiting head (411) of the central shaft (41) can be rotated relative to the positioning head (212) of the tilt shaft (21). Therefore, the central shaft (41) can be rotated relative to the tilt shaft (21).

When the limiting sides (412) of the limiting head (411) of the central shaft (41) align with the positioning head (212) of the tilt shaft (21), the positioning protrusion (216) engages the annular slot (414) in the limiting head (411) of the central shaft (41) to keep the tilt shaft (21) from rotating relative to the central shaft (41). Therefore, the cover (50) cannot be closed when the cover (50) is rotated relative to the base (60) to prevent unnecessary broken.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
    a central bracket having
        a main arm having
            a first end;
            a second end;
            an inner surface;
            an outer surface;
            a circular central hole; and
            an annular recess formed in the inner surface of the main arm around the central hole to reduce abrasions;
        a first arm formed perpendicularly on the first end of the main arm and having
            an inner surface;
            an outer surface;
            a circular central hole;
            an inner annular recess formed in the inner surface of the first arm around the central hole to reduce abrasions; and
            an outer annular recess formed in the outer surface of the first arm around the central hole to reduce abrasions; and
        a second arm formed perpendicularly on the second end of the main arm;
    a first tilt hinge assembly connecting to the first arm of the central bracket and comprising
        a tilt shaft connecting rotatably to the first arm and having
            an inner end;
            a positioning head formed radially on the inner end of the tilt shaft; and
            a positioning protrusion formed axially on an inner surface of the positioning head; and
        a first rotating bracket mounted securely on the tilt shaft;
    a second tilt hinge assembly connecting to the second arm of the central bracket and comprising
        a barrel connecting securely to the second arm of the central bracket; and
        a second rotating bracket mounted rotatably on the barrel; and
    a rotating hinge assembly connecting to the main arm of the central bracket and comprising
        a central shaft connecting rotatably to main arm of the central bracket and having an inner end; and a limiting head formed radially on the inner end of the central shaft, corresponding to the positioning head of the tilt shaft and having
two limiting sides being opposite to each other;
two flat sides being opposite to each other and formed between two limiting sides, wherein the limiting sides and the flat sides alternatively align with the positioning head of the tilt shaft; and
an annular slot formed radially in the limiting head of the central shaft and corresponding to and selectively engaging the positioning protrusion of the positioning head of the tilt shaft and disengaging from the positioning protrusion of the positioning head of the tilt shaft when one of the flat sides of the limiting head aligns with the positioning head of the tilt shaft; and
a fastening bracket mounted securely on the central shaft.

2. The hinge as claimed in claim 1, wherein
the first arm of the central bracket has at least one positioning detent formed in the outer annular recess of the first arm; and
the first tilt hinge assembly further comprises a stationary positioning spacer mounted securely on the tilt shaft adjacent to the outer surface of the first arm of the central bracket and having
an inner surface facing to the outer surface of the first arm; and
at least one positioning protrusion that is formed on the inner surface of the stationary positioning spacer and corresponds to and selectively engages the at least one positioning detent of the first arm.

3. The hinge as claimed in claim 1, wherein
the first arm has at least one limiting protrusion formed on and extending from the inner surface of the first arm; and
the tilt shaft has
an outer end; and
a limiting head formed radially on the outer end of the tilt shaft and having an outer surface abutting the inner surface of the first arm; and
a limiting protrusion formed transversely on an edge of the limiting head and selectively abutting the at least one limiting protrusion of the first arm.

4. The hinge as claimed in claim 2, wherein
the first arm has at least one limiting protrusion formed on and extending from the inner surface of the first arm; and
the tilt shaft has
an outer end; and
limiting head formed radially on the outer end of the tilt shaft and having an outer surface abutting the inner surface of the first arm; and
a limiting protrusion formed transversely on an edge of the limiting head and selectively abutting the at least one limiting protrusion of the first arm.

5. The hinge as claimed in claim 1, wherein
the main arm of the central bracket has at least one positioning detent formed in the annular recess of the main arm; and
the rotating hinge assembly further comprises a rotating positioning spacer that is mounted securely on the central shaft adjacent to the inner surface of the main arm and has at least one positioning protrusion formed on the rotating positioning spacer and corresponding to and selectively engaging the positioning detent of the main arm.

6. The hinge as claimed in claim 4, wherein
the main arm of the central bracket has at least one positioning detent formed in the annular recess of the main arm; and
the rotating hinge assembly further comprises a rotating positioning spacer that is mounted securely on the central shaft adjacent to the inner surface of the main arm and has at least one positioning protrusion formed on the rotating positioning spacer and corresponding to and selectively engaging the positioning detent of the main arm.

7. The hinge as claimed in claim 1, wherein
the main arm of the central bracket has two ribs being perpendicularly formed on the two sides of the main arm respectively and extended from the inner surface;
the limiting sides and flat sides of the limiting head of the central shaft alternatively align with the ribs; and
the limiting sides of the limiting head of the central shaft engage the ribs when the limiting sides align with the ribs.

* * * * *